(12) United States Patent
Slobodyanskiy et al.

(10) Patent No.: US 12,158,114 B2
(45) Date of Patent: Dec. 3, 2024

(54) DISPATCH ADVISOR FOR OPERATING POWER PLANT WITH FLEXIBILITY

(71) Applicant: GENERAL ELECTRIC COMPANY, Schenectady, NY (US)

(72) Inventors: Ilya Alexandrovich Slobodyanskiy, Simpsonville, SC (US); David Leach, Simpsonville, SC (US); Berardino Pezzella, Giussano (IT)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 365 days.

(21) Appl. No.: 17/243,758

(22) Filed: Apr. 29, 2021

(65) Prior Publication Data

US 2022/0349352 A1  Nov. 3, 2022

(51) Int. Cl.
*F02C 9/00* (2006.01)
*F02C 6/00* (2006.01)

(52) U.S. Cl.
CPC ............ *F02C 9/00* (2013.01); *F02C 6/00* (2013.01); *F05D 2220/32* (2013.01); *F05D 2220/72* (2013.01); *F05D 2270/05* (2013.01); *F05D 2270/303* (2013.01)

(58) Field of Classification Search
CPC ............ F02C 7/224; F02C 9/28; F02C 9/26
See application file for complete search history.

(56) References Cited

U.S. PATENT DOCUMENTS

| | | | | |
|---|---|---|---|---|
| 9,255,525 B2 * | 2/2016 | Ewens | ............. | F02C 9/28 |
| 2009/0150040 A1 * | 6/2009 | Rofka | ............. | F02C 9/54 |
| | | | | 701/100 |
| 2014/0033731 A1 * | 2/2014 | Rackwitz | ............. | F02C 7/224 |
| | | | | 60/776 |
| 2016/0258361 A1 | 9/2016 | Tiwari et al. | | |
| 2017/0074175 A1 * | 3/2017 | Uyama | ............. | F02C 7/04 |
| 2018/0284706 A1 * | 10/2018 | Anubi | ............. | G05B 19/042 |

FOREIGN PATENT DOCUMENTS

EP  2434127  3/2012

OTHER PUBLICATIONS

George Marin, Dmitrii Mendeleev, Boris Osipov, and Azat Akhmetshin, "Study of the effect of fuel temperature on gas turbine performance", E3S Web of Conferences 178, 01033 (2020) (Year: 2020).*
European Search Report dated Sep. 21, 2022 from corresponding European Application No. 22168141.4-1004.

* cited by examiner

*Primary Examiner* — Thuyhang N Nguyen
(74) *Attorney, Agent, or Firm* — Grogan, Tuccillo & Vanderleeden, LLP

(57) ABSTRACT

A dispatch advisor for operating a power plant having at least one gas turbine with flexibility is described. The dispatch advisor can generate a representation of a flexible base load map for operating the power plant. The representation can include an aggregation of a primary base load operating space and an expanded portion of the base load operating space. The representation offers a range of operating values for operational parameters of the power plant during base load at various base load settings at predetermined ambient conditions and corresponding power output and efficiency values that are attained while operating the power plant at the range of operating values. This offers an operator of the power plant with flexibility in controlling the plant during base load.

20 Claims, 7 Drawing Sheets

DISPATCH ADVISOR FOR OPERATING POWER PLANT WITH FLEXIBILITY

CROSS REFERENCE TO RELATED APPLICATIONS

The present patent application is related to concurrently filed, co-pending, and commonly assigned U.S. patent application Ser. No. 17/243,876, entitled DISPATCH ADVISOR TO ASSIST IN SELECTING OPERATING CONDITIONS OF POWER PLANT THAT MAXIMIZES OPERATIONAL REVENUE, the disclosure of which is incorporated herein by reference.

BACKGROUND

Technical Field

Embodiments of the invention relate generally to power plants and more particularly, to providing a dispatch advisor that generates an operating space for operating a power plant such as a combined-cycle power plant with flexibility during base load.

Discussion of Art

Many power plants such as combined-cycle power plants employ gas turbines as a source of power to satisfy at least part of consumers' overall electrical demand. Plant operators sometimes peak-fire their gas turbines above their base capacity during peak demand periods. Peak-firing gas turbines above their base capacity produces extra power output when needed, but at the expense of faster parts-life consumption (e.g., extra factored fired hours). If gas turbines are peak-fired often within the maintenance interval (or maintenance life), the incremental parts-life consumption may cause the maintenance interval to be shortened. As a result, maintenance schedules are pulled in and extra customer service agreement charges may be incurred. Consideration of these extra maintenance costs, in terms of more frequent servicing of the gas turbines, can lead plant asset owners to exercise peak-fire mode more conservatively than necessary, which may result in missed revenue opportunity.

BRIEF DESCRIPTION

The following presents a simplified summary of the disclosed subject matter in order to provide a basic understanding of some aspects of the various embodiments. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

Embodiments are directed to providing solutions that are directed to advising operators of power plants utilizing gas turbines such as combined-cycle power plants, on how to operate the power plants with flexibility during base load. The solutions provided by the various embodiments include generating a representation of flexible base load map that contains a flexible base load operating space for operating the power plant. The representation can include an aggregation of a primary base load operating space and an expanded portion of the base load operating space indicative of a secondary base load operating space. The representation offers a range of operating values for operational parameters of the power plant during base load at various base load settings at predetermined ambient conditions, and corresponding power output and efficiency values that are attained while operating the power plant at the range of operating values. To this extent, the representation offers an operator of the power plant with flexibility in controlling the plant during base load.

In one embodiment, a method for generating guidance for operating a power plant having at least one gas turbine to meet base load power demands, is provided. The method comprises: obtaining, by a system comprising at least one processor, a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine; correlating, by the system, the plurality of base load data for the operational parameters to power output and efficiency values that are attained by the power plant while operating at each of the plurality of base load settings at the predetermined ambient conditions during base load; determining, by the system, a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency; expanding, by the system, the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating, by the system, a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, offering an operator of the power plant with flexibility in controlling the power plant during base load.

In another embodiment, a system is provided. The system comprises: a memory that stores executable components; at least one processor, operatively coupled to the memory, that executes the executable components. The executable components comprises: a flexible base load map generation component for generating a flexible base load map for operating a power plant having at least one gas turbine to meet base load power demands. The flexible base load map generation component is configured to perform the method comprising: obtaining, by the processor, a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine; correlating, by the processor, the plurality of base load data for the operational parameters to power output and efficiency values that are attained by the power plant while operating at each of the plurality of base load settings at the predetermined ambient conditions during base load; determining, by the processor, a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency; expanding, by the processor, the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating, by the processor, a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, offering an operator of the power plant with flexibility in controlling the power plant during base load.

In yet another embodiment, a non-transitory computer-readable medium having stored thereon executable instructions that, in response to execution, cause a system comprising at least one processor to perform operations directed to generating a flexible base load map for operating a power plant having at least one gas turbine to meet base load power demands is provided. The operations comprising: obtaining a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine; correlating the plurality of base load data for the operational parameters to power output and efficiency values that are attained by the power plant while operating at each of the plurality of base load settings at the predetermined ambient conditions during base load; determining a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency; expanding the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, offering an operator of the power plant with flexibility in controlling the power plant during base load.

DRAWINGS

The present invention will be better understood from reading the following description of non-limiting embodiments, with reference to the attached drawings, wherein below:

DETAILED DESCRIPTION

Figure 1:
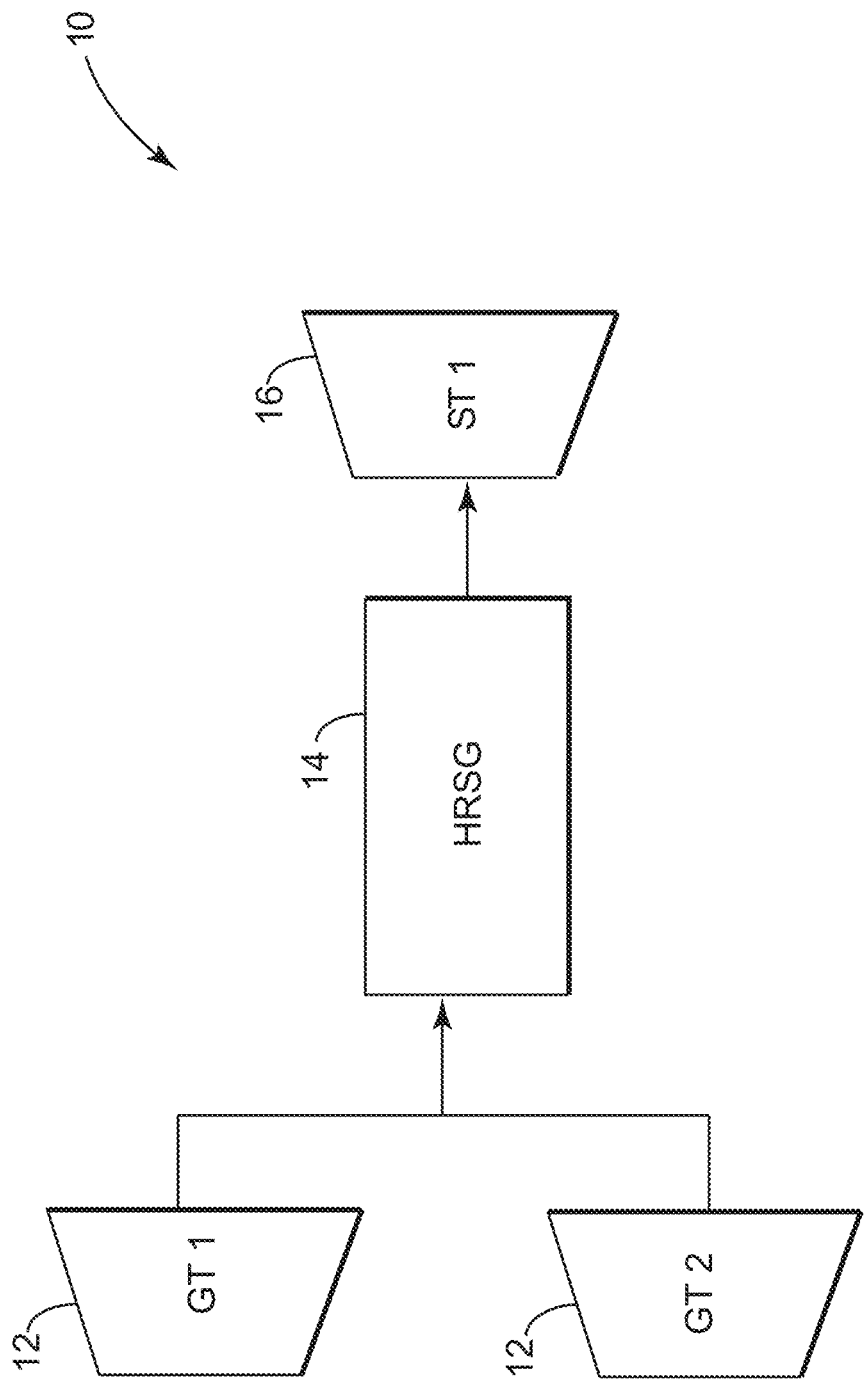
FIG. 1 is a block diagram of an example of a power plant in which embodiments of the present invention are suitable for use in providing guidance on how to manage its operation in accordance with an embodiment of the present invention.

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. Like numbers may refer to like elements throughout.

According to aspects of the present invention, systems and methods are disclosed which may be used to optimize the performance of power systems, power plants, and/or thermal power generating units for a given set of design and operating control capabilities. In exemplary embodiments, this optimization can include guidance to an operator of a power plant in selection of optimum operating conditions of the plant. In other embodiments, this optimization can include an economic optimization by which an operator of a power plant decides between alternative modes of operation in order to enhance profitability. These embodiments may be utilized within a particular power system in order to provide a competitive edge in procuring advantageous economic commitment terms during a dispatch process of the power system.

An adviser function associated with the various embodiments may guide the operator of the power plant in the selection of optimum operating conditions of the power plant. To this extent, the adviser function may allow the operator to make choices between operating modes based on accurate economic comparisons and projections. For example, the advisor function can assist an operator in selecting operating conditions of the power plant that maximizes operational revenue by selling power in a spot market, while allowing for the highest possible capacity payments for capacity or power commitments entered into over a capacity market. The advisor function can also be used to assist in forecasting operational scenarios, manage outages and availability. For example, an operator of a power plant can use the advisor function for the process of prospectively purchasing fuel for future generating periods so that fuel inventory is minimized, while not increasing the risk of a shortfall. In another example, an operator of a power plant can use the advisor function in the process of prospectively setting a service and maintenance program that determines when to service and/or replace various parts and components of the power plant in a manner that minimizes downtime and availability of the power plant.

Technical effects of some configurations of the various embodiments of the present invention include the generation and solution of an energy system representation that advises or provides guidance on optimally operating a power plant under varying physical, operational, and/or economic conditions with as much flexibility as possible. In doing this, an operator of a power plant can select optimum operating conditions of the power plant that maximize profitability for particular combinations of ambient, operational, contractual, regulatory, legal, and/or economic and market conditions.

Turning now to the figures, FIG. 1 shows a block diagram of an example of a power plant 10 in which embodiments of the present invention are suitable for use in providing guidance on how to manage its operation in accordance with an embodiment of the present invention. The power plant 10 depicted in FIG. 1 is a combined-cycle power plant, and in particular, is an example of 2×1 combined-cycle power plant that comprises two gas turbines 12 (GT 1 and GT 2) a heat recovery steam generator (HRSG) 14, and a steam turbine 16 (ST 1). In general, the gas turbines 12 (GT 1 and GT 2) are heated to a high temperature. The HRSG 14 captures the exhaust gas from the gas turbines 12 (GT 1 and GT 2) to create steam that is delivered to the steam turbine 16 (ST 1). Both the gas turbines 12 (GT 1 and GT 2) and the steam turbine 16 (ST 1) can drive a generator to produce electricity that is supplied to an electrical power grid. It is understood that this 2×1 combined-cycle power plant configuration is only an example of one combined-cycle power plant in which the various embodiments have utility. While the various embodiments are described with respect to a combined-cycle power plant, these embodiments are suitable for use with other power plants that include at least one gas turbine.

It is understood that the power plant 10 depicted in FIG. 1 is a simplified representation of a combined-cycle power plant, and those skilled in the art will appreciate that the power plant can include other components. For example, the power plant 10 can include a component controller that controls various aspects of parts, components, machines, apparatuses or the like that are operatively coupled with each of the gas turbines 12 (GT 1 and GT 2), the heat recovery steam generator (HRSG) 14, and the steam turbine 16 (ST 1), including, but not limited to, sensors, valves, etc. In addition, the power plant 10 can include a plant controller that receives data and sends or instructs the component controller to facilitate any of a number of operations. It will be appreciated that the component controller and the plant controller may be combined into a single controller. In any event, the plant controller may communicate with a plant operator and any of a number of data resources. According to certain embodiments, the plant controller can issue recommendations to the plant operator regarding desired operating setpoints for the power plant 10. The plant controller can also receive instructions and commands from the plant operator regarding a number of different operations. In addition, the plant controller may receive and store data on the operation of the components and subsystems of the power plant 10. The various embodiments described herein are suitable for use as a functionality that operates as a part of the plant controller.

In a typical combined-cycle power plant, the base load of the power plant at given ambient conditions can be defined by the firing temperature or operating temperature of the gas turbine, and a position of the inlet guide vanes (IGV) in the gas turbine. To this extent, the firing temperature and the IGV position can define an operating point for the combined-cycle power plant with the highest output and efficiency. However, operating the combined-cycle power plant according to a defined operating point has its limitations.

The various embodiments of the present invention overcome these limitations associated with operating the combined-cycle power according to an operating point, by defining an operating space of optimum operating conditions for operating the combined-cycle power plant that an operator can use as guidance to select specific settings of operational parameters of the power plant that are represented in the operating space during base load at predetermined ambient conditions. The derivation of the operating space associated with the various embodiments is based on combined-cycle power plants that utilize gas turbines that have an option of partial peak firing. This allows an operator to command a desired output. In some instances, this option makes it possible for the gas turbine to increase the firing temperature (within +35 F range) to achieve a target megawatt (MW) output. At a predetermined compressor inlet temperature (CTIM) (e.g., CTIM <22 C), the IGV position can be defined as an exhaust Mach number (the "Mach number"). On this basis, an operating line for operating the power plant can be defined by the firing temperature and the Mach number. This operating line can be expanded from a line to an operating space that represents the space of operation of the firing temperature and the Mach number of the power plant during base load at predetermined ambient conditions. For example, in one embodiment, the operating space of the power plant can be defined by a variable firing temperature and a constant Mach number. From this operating space, the power plant can be operated to achieve target output and efficiency.

The capability to operate the power plant with variable firing temperature in order to increase output and efficiency is beneficial, however, there are drawbacks in that there is an impact on the life cycle of parts or components of the power plant. For example, an increased firing temperature and exposure time at the increased temperature will adversely impact the life cycle of combustion and hot gas path parts, which can result in maintenance and replacement costs to keep the power plant operational for meeting base load power demands, as well as availability issues due to service. In another scenario, increasing the Mach number can reduce the life of a rotor of the gas turbine, and thus, require maintenance. Since it is expected that as gas turbine technology evolves, the Mach numbers will increase. This will allow for more gas turbine output, and hence, more combined-cycle power plant output, but at a lower efficiency.

In order to accommodate a larger operating space that accounts for variable firing temperatures and Mach numbers, and the effect that variable operational parameters will have on the output and efficiency of the power plant, the various embodiments are directed to improving upon the operating space that can be based on a variable firing temperature and a constant Mach number. For example, the various embodiments are directed to providing an operating space that represents variable firing temperatures and Mach numbers in relation to their effects on the output and efficiency of the power plant. In one example, an operator of a power plant can use the operating space from the various embodiments that contains an expanded representation of the increased firing temperature and Mach number values to adjust target plant load and efficiency. To this extent, an operator can adjust the target plant load and efficiency to accommodate one of a number of business interests that can include, but are not limited to, maximizing revenue, forecasting operational scenarios, managing outages and availability, purchasing fuel, and planning for service and maintenance.

The larger operating space of the various embodiments also takes into account the increased firing temperature and Mach number values that can result in sub-optimal efficiency. As used herein, sub-optimal efficiency means that the power plant runs at less than full power and implies that the capital costs per megawatt (MW) of the output of the plant are higher. In particular, the operating space of the various embodiments is expanded to accommodate another operational parameter that can have an added role in effecting the output and efficiency that results from the increased firing temperature and Mach number values. In one embodiment, this additional operational parameter can include the fuel temperature of the fuel in the gas turbine. With this added operational parameter in the operational space, an operator can use the operational space to select optimum conditions for the firing temperature, Mach number, and the fuel temperature in those instances where it is desired to run at a higher output, but at sub-optimal efficiency. In this manner, the operator can adjust the firing temperature, Mach number and the fuel temperature to accommodate one of a number of business interests that can include, but are not limited to, maximizing revenue, forecasting operational scenarios, managing outages and availability, purchasing fuel, and planning for service and maintenance. For example, in one embodiment, the operator can adjust these parameters to maximize operational revenue based on instantiations of market conditions. This can include selling power in a spot market, while allowing for the highest possible capacity payments for capacity or power commitments entered into over a capacity market. In some instances, this can be of interest to power plant operators even despite the effect that sub-optimal efficiency can have in not yielding the highest revenue due to the impact on parts of the turbine such as combustion, hot gas parts and rotor life. For example, changes to the fuel temperature, such as lowering it, can increase output and lower efficiency, but have no impact on maintenance and availability, and thus, do not adversely affect the operational revenue.

Figure 2:
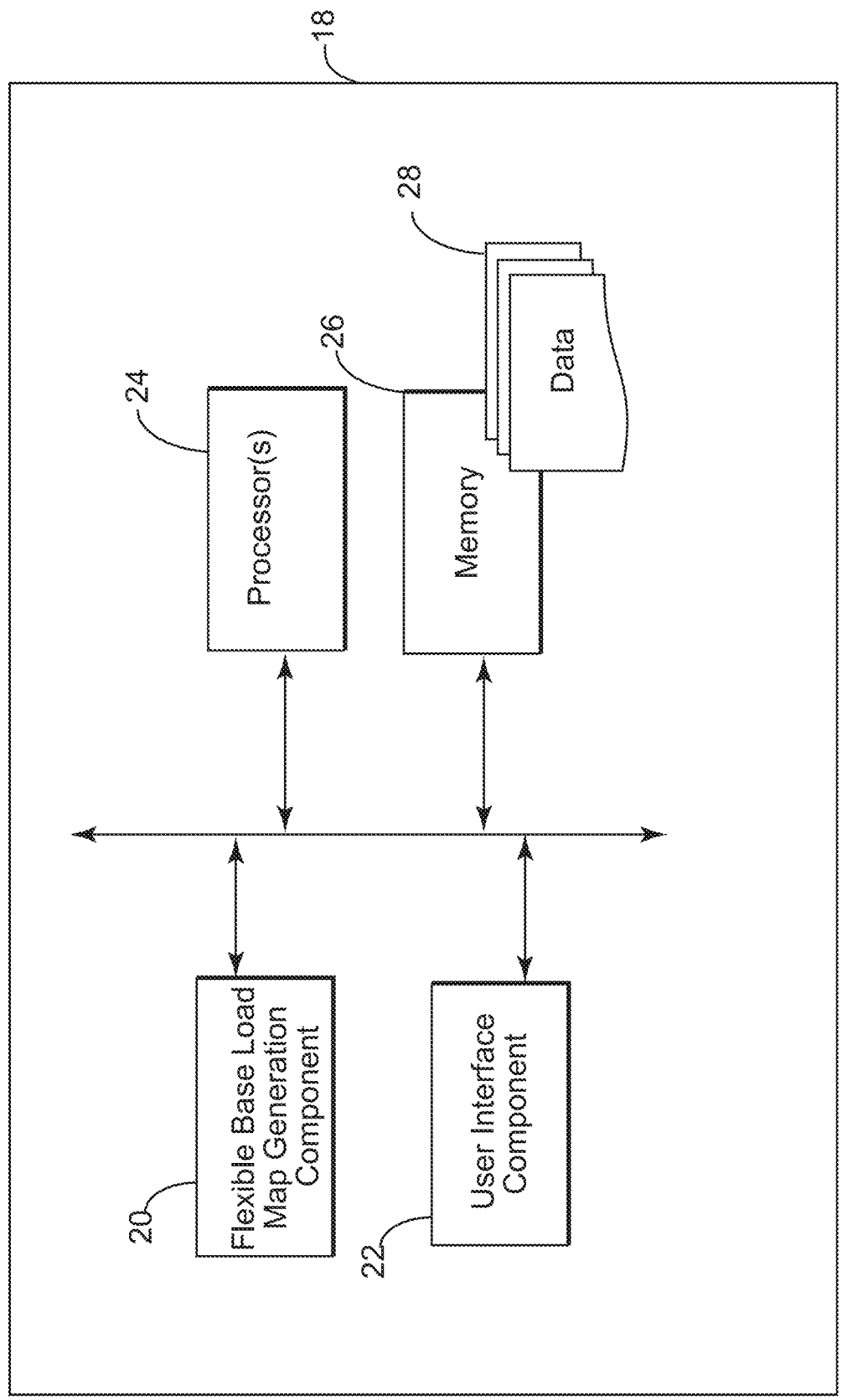
FIG. 2 is a block diagram of an example of a dispatch advisor system for operating a power plant having at least one gas turbine with flexibility in accordance with an embodiment of the present invention.

FIG. 2 is a block diagram of an example of a dispatch advisor system 18 for operating a power plant having at least one gas turbine with flexibility in accordance with an embodiment of the present invention. Aspects of the dispatch advisor system 18 including methods, processes, and operations performed thereby can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Further, the description that follows for the dispatch advisor system 18 in FIG. 2, as well as the description associated with other figures may use the terms "object," "module," "interface," "component," "system," "platform," "engine," "selector," "manager," "unit," "store," "network," "generator" and the like to refer to a computer-related entity or an entity related to, or that is part of, an operational machine or apparatus with a specific functionality. These entities can be either hardware, a combination of hardware and firmware, firmware, a combination of hardware and software, software, or software in execution. In addition, entities identified through the above terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts. The electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

Referring again to FIG. 2, the dispatch advisor system 18 can include a flexible base load map generation component 20, a user interface component 22, one or more processors 24, and memory 26 that stores data 28. In various embodiments, one or more of the flexible base load map generation component 20, the user interface component 22, the one or more processors 24, and the memory 26 can be electrically and/or communicatively coupled to one another to perform one or more of the functions of the dispatch advisor system 18. In some embodiments, one or more of the flexible base load map generation component 20 and the user interface component 22 can comprise software instructions stored on the memory 26 and executed by processor(s) 24. In addition, the dispatch advisor system 18 may interact with other hardware and/or software components not depicted in FIG. 2. For example, processor(s) 24 may interact with one or more external user interface devices, such as a keyboard, a mouse, a display monitor, a touchscreen, or other such interface devices.

The flexible base load map generation component 20 can be configured to generate a flexible base load map for operating a power plant having at least one gas turbine to meet base load power demands. The flexible base load map can include an operating space for operating the power plant according to a plurality of operational parameters. In one embodiment, the operational parameters can include the firing temperature of the gas turbine and position of inlet guide vanes in the gas turbine, and the fuel temperature of the fuel in the gas turbine. The flexible base load map can include a primary base load operating space obtained from a first set of the operational parameters that provides power output and efficiency values of the power plant that are attained over an operating space of the first set of operational parameters. In one embodiment, the first set of operational parameters can include the firing temperature and the position of the inlet guide vanes. In general, the primary base load operating space is indicative of a primary operating space to attain target plant power output and efficiency. The flexible base load map can further include an expanded portion that provides an operating space that relates to a second set of the operational parameters of the power plant. In one embodiment, the second set of the operational parameters can include the firing temperature, the position of the inlet guide vanes, and the fuel temperature. In general, the expanded portion of the base load operating space is indicative of a secondary operating space that attains higher plant power output and sub-optimal efficiency in relation to the primary base load operating space.

The user interface component 22 can be configured to receive user input and to render output to the user in any suitable format (e.g., visual, audio, tactile, etc.). In some embodiments, the user interface component 22 can be configured to generate a graphical user interface that can be rendered on a client device that communicatively interfaces with the dispatch advisor system 18, or on a native display component of the system 18 (e.g., a display monitor or screen). Input data can include, for example, base load data related to the operational parameters of the power plant during base load at a plurality of base load settings at predetermined ambient conditions. As noted above, in one embodiment, the operational parameters can include the firing temperature of the gas turbine, the position of the inlet guide vanes in the gas turbine, and the fuel temperature of the fuel in the gas turbine. In addition to the base load settings of these operational parameters, the input data can include the power output and efficiency values that are attained by the power plant while operating at each of the base load settings at the predetermined ambient conditions during base load. It is understood that the input data can include other data related to other operational parameters. Moreover, it is understood that although the various embodiments are described with respect to parameters that include the firing temperature, the position of the inlet guide vanes, and the fuel temperature, other operational parameters such as temperature, pressure, humidity and gas flow characteristics at locations defined along the path of the working fluid, as well as ambient conditions, fuel characteristics, and other measurables can be used to generate the flexible base load map. In addition to the aforementioned data, the input data can include, for example, user-defined constraints to be taken into account when generating the flexible base load map (e.g., upper and lower limits on gas turbine operating temperature or power output, definition of a desired operating horizon, definition of ambient conditions, identification of days during which the gas turbines are not allowed to run, etc.).

The output data that can be rendered by the user interface component 22 can include, but are not limited to, graphical renderings of one or more representations of the flexible base load map for operating the power plant that is generated by the flexible base load map generation component 20. Other output data that can be provided by the user interface component 22 can include, for example, a text-based or graphical renderings of a plant asset operating profile or schedule. It is understood that both the input data and the output data can be stored in memory 26 as part of the stored data 28.

The one or more processors 24 can perform one or more of the functions described herein with reference to the systems and/or methods disclosed. The memory 26 can be a computer-readable storage medium that can store computer-executable instructions and/or information for performing the functions described herein with reference to the systems and/or methods disclosed.

Although features of the dispatch advisor system 18 are described herein with reference to gas turbines, it is to be appreciated that embodiments of the dispatch advisor system 18 are not limited to use solely with gas turbines, but rather can be used to generate a flexible base load map having an extended operating space that is suitable for other types of power-generating assets.

Figure 3:
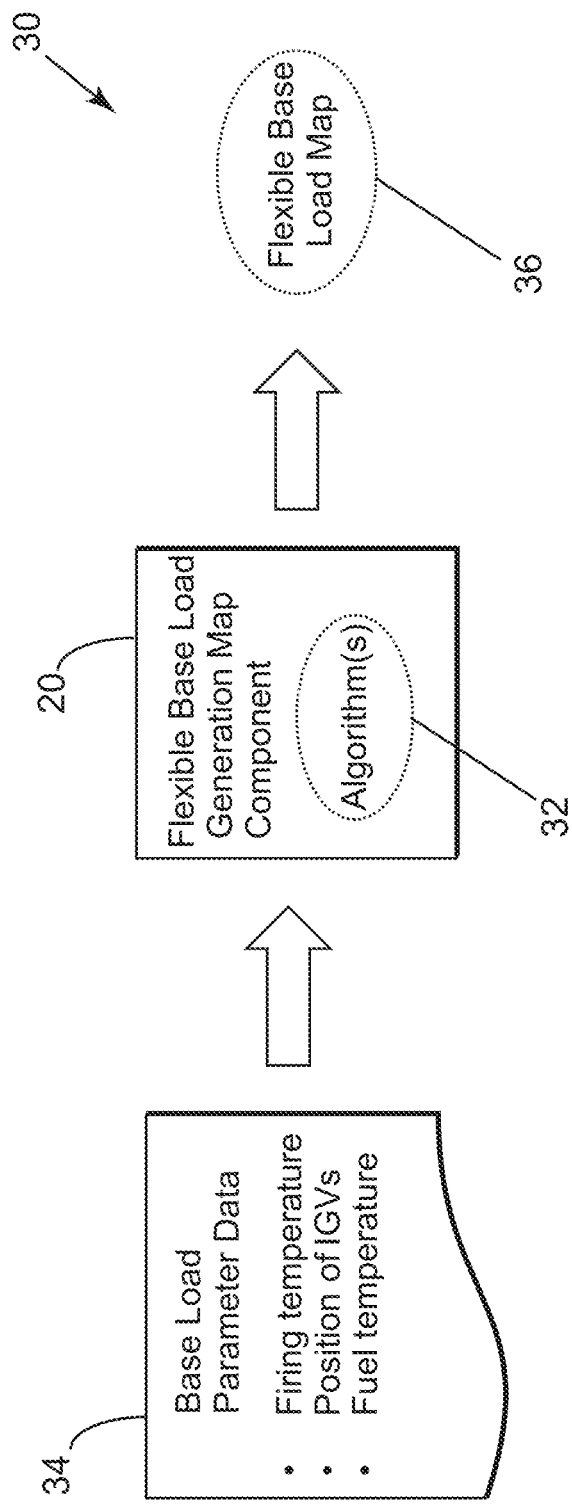
FIG. 3 is a block diagram illustrating example data inputs and outputs for a flexible base load generation component of the dispatch advisor system depicted in FIG. 2 in accordance with an embodiment of the present invention.

FIG. 3 is a block diagram 30 illustrating example data inputs and outputs for a flexible base load generation component 20 of the dispatch advisor system 18 depicted in FIG. 2 in accordance with an embodiment of the present invention. More particularly, the block diagram of FIG. 3 illustrates that the flexible base load generation component 20 is configured to utilize one or more algorithms 32 for operating on base load parameter data 34 to generate a flexible base load map 36. The base load parameter data 34 can include, for example, base load data related to the operational parameters of the power plant during base load at a plurality of base load settings at predetermined ambient conditions. As noted above, in one embodiment, the operational parameters can include the firing temperature of the gas turbine, the position of the inlet guide vanes in the gas turbine, and the fuel temperature of the fuel in the gas turbine. In addition to the base load settings of these operational parameters, the base load parameter data 34 can include the power output and efficiency values that are attained by the power plant while operating at each of the base load settings at the predetermined ambient conditions during base load. With the base load parameter data 34, the algorithm(s) 32 of the flexible base load generation component 20 can generate the flexible base load map 36. Further details of the algorithm(s) 32 and the flexible base load map 36 are discussed below with reference to FIGS. 4 and 5, respectively.

Figure 4:
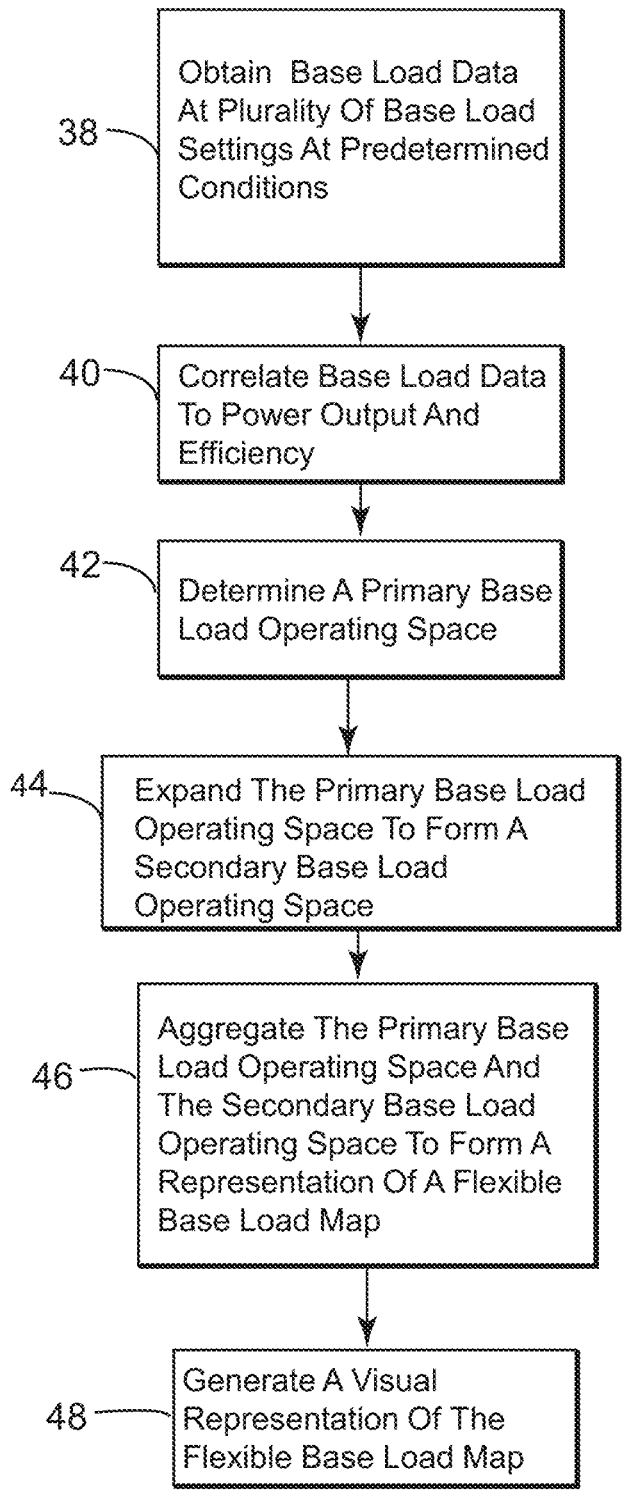
FIG. 4 is flow chart describing examples of operations of an algorithm associated with the flexible base load generation component that can generate a flexible base load map in accordance with an embodiment of the present invention.

As shown in FIG. 4, the algorithm 32 to generate the flexible base load map 36 begins at 38 where a plurality of base load data related to operational parameters of the power plant during base load, at a plurality of base load settings, at predetermined ambient conditions, are obtained. In one embodiment, the operational parameters for which the base load data is obtained can include, but are not limited to, the firing temperature of the gas turbine, the position of inlet guide vanes in the gas turbine, and the fuel temperature of the fuel in the gas turbine.

The obtaining of the base load data can include receiving, gathering or acquiring the data using any of a number of well-known approaches. In one embodiment, the base load data can reside in data libraries, resources and repositories, which may be referred to herein generally as "data resources" that are connected to the dispatch advisor system 18, and in particular, the flexible base load map generation component 20 via communications lines or over which data is exchanged. The data resources may include several types of data, including but not limited to: operating data relating to the operational parameters, and ambient data. The ambient data can include information related to ambient conditions at the plant, such as ambient air temperature, humidity, and/or pressure. The operating, and ambient data each may include historical records, present condition data, and/or data relating to forecasts. For example, data resources may include present and forecast meteorological/climate information, present and forecast market conditions, usage and performance history records about the operation of the power plant, and/or measured, observed, or tracked parameters regarding the operation of other power plants having similar components and/or configurations, as well as other data as may be appropriate and/or desired. The communications lines may be wired or wireless, and further, it will be appreciated that the data resources and the dispatch advisor system 18 may be connected to or be part of a larger communications system or network, such as the internet or a private computer network.

The algorithm of FIG. 4 continues at 40 where the base load data is correlated to power output and efficiency values. In one embodiment, the base load data for the operational parameters at each of the plurality of base load settings at the predetermined ambient conditions during base load are correlated to the power output and efficiency values that are attained by the power plant for each of the respective values. To this extent, the flexible base load map generation component 20 can ascertain the power output and efficiency values that are attained by the power plant for each of the values of the operational parameters at each of base load settings.

With this correlation of data, the algorithm run by the flexible base load map generation component 20 can determine a primary base load operating space at 42. In one embodiment, this primary base load operating space is indicative of a primary operating space that enables the power plant to attain target plant power output and efficiency. To this extent, a plant operator can use the primary base load operating space to operate a power plant during base load in a manner that achieves a target output and efficiency. It is understood that the primary base load operating space can be used by the plant operator as guidance to operate the power plant to achieve other target objectives. For example, the plant operator can use the primary base load operating space for purposes of maximizing operational revenue of the power plant based on instantiations of market conditions.

In one embodiment, the primary base load operating space can be determined from a first set of the operational parameters used in the correlation of the data. To this extent, the primary the base load operating space provides a representation that associates the power output and efficiency values of the power plant that are attained with the first set of operational parameters while operating at each of the plurality of base load settings at the predetermined ambient conditions during base load. In one embodiment, the first set of operational parameters can include the firing temperature and the position of the inlet guide vanes.

After determining the primary base load operating space, a secondary base load operating space can be formed at 44 by expanding upon the primary base load operating space. The secondary base load operating space can be formed from a second set of the operational parameters used in the correlation of the data. For example, the second set of the operational parameters can include the firing temperature, the position of the inlet guide vanes, and the fuel temperature. In one embodiment, the secondary base load operating space is representative of an expanded portion of the primary base load operating space that attains higher plant power output and less than optimal or sub-optimal efficiency in relation to the primary base load operating space. To this extent, a plant operator can use the secondary base load operating space to operate a power plant during base load to achieve different targets in scenarios where it may not be desirable to operate the plant at a high output and efficiency. For example, a plant operator can use the secondary base load operating space to maximize capacity payments for capacity or power commitments entered into over a capacity market at an expense of yielding maximum revenue due to lower efficiency and impact on service life of components of the power plant.

The operations of the algorithm 32 of the flexible base load map generation component 20 can continue at 46 where the primary base load operating space and the secondary base load operating space are aggregated to form a flexible base load map for operating the power plant. In one embodiment, the representation of the flexible base load map offers a range of operating values for the operational parameters and corresponding power output and efficiency values that are attained while operating the power plant at the range of operating values. With this representation containing both the primary base load operating space and the secondary base load operating space, the resulting flexible base load map offers an operator of a power plant with flexibility in controlling the power plant during base load. In particular, the resulting representation provides a first operating space (i.e., the primary base load operating space) that the operator can use to attain target plant power output and efficiency, and a second operating space that attains higher plant power output and less than optimal or sub-optimal efficiency in relation to the first operating space, which offer the operator the option to control the plant in accordance with other objectives that are not concerned with high output and high efficiency (e.g., to maximize capacity payments). This aggregation of the primary base load operating space and the secondary base load operating space can be presented to a plant operator at 48 in the form of a visual representation such as a flexible base load map, of which an example is depicted in FIG. 5.

While, for purposes of simplicity of explanation, the operations shown in FIG. 4 are described as a series of acts. It is to be understood and appreciated that the subject innovation associated with FIG. 4 is not limited by the order of acts, as some acts may, in accordance therewith, occur in a different order and/or concurrently with other acts from that shown and described herein. For example, those skilled in the art will understand and appreciate that a methodology or operations depicted in FIG. 4 could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 5:
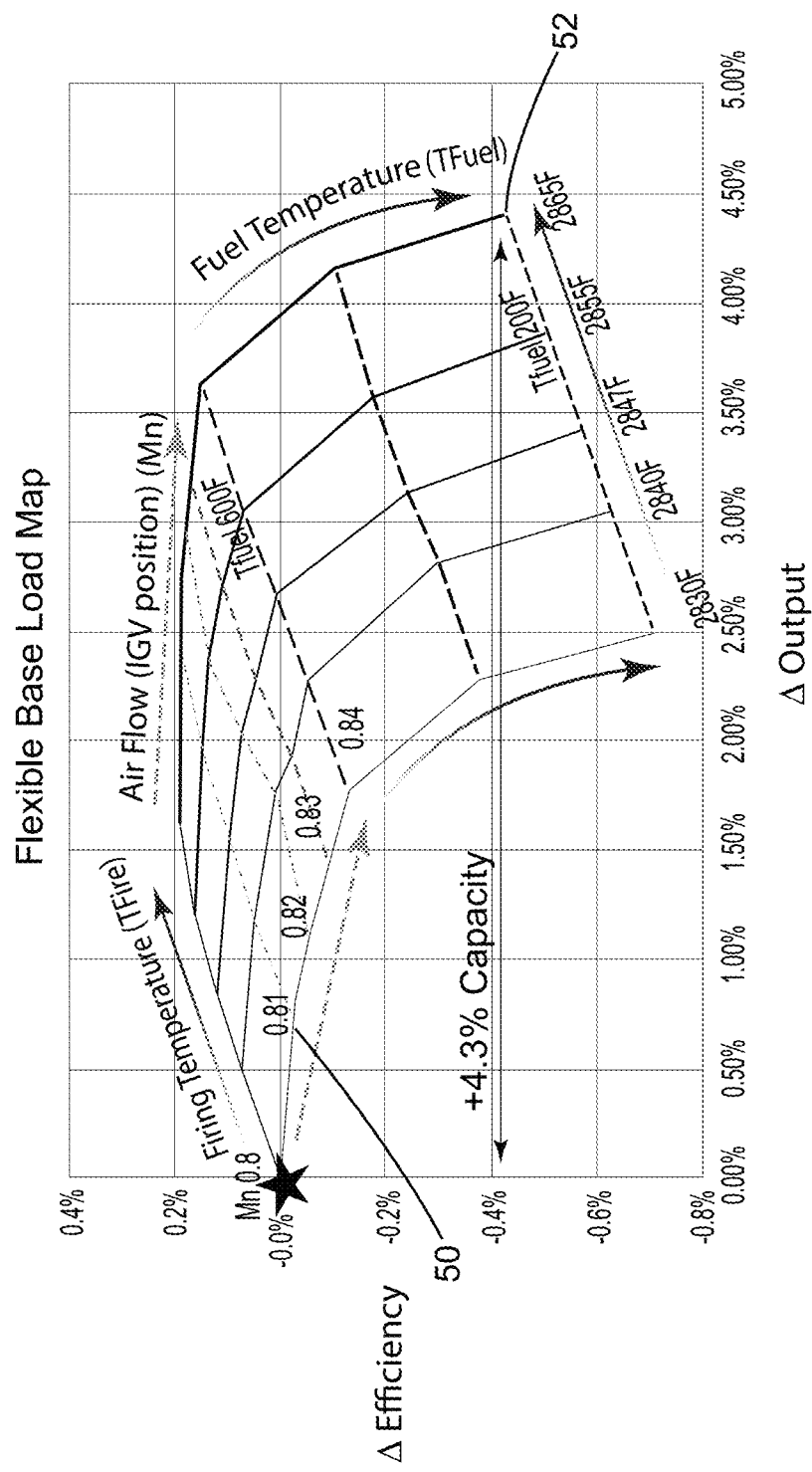
FIG. 5 is an example of a representation of a flexible base load map for operating a power plant that can be generated by the flexible base load generation component using the operations depicted in FIG. 4 in accordance with an embodiment of the present invention.

FIG. 5 is an example of a representation of a flexible base load map 36 for operating the power plant that can be generated by the flexible base load generation component 20 of the dispatch advisor system 18 using the operations depicted in FIG. 4 in accordance with an embodiment of the present invention. FIG. 5 shows the flexible base load map 36 with an operating space defined by operational parameters which can include the firing temperature (TFire) of the gas turbine, the Mach number (Mn) which corresponds to the IGVs position in the gas turbine, and the fuel temperature (TFuel) of the fuel in the gas turbine. As shown in FIG. 5, the flexible base load map 36 can comprise a multi-dimensional representation of these operational parameters. In particular, the multi-dimensional representation of the flexible base load map 36 in FIG. 5 differentiates a primary base load operating space 50 from the expanded portion 52 of the base load operating space which is representative of the secondary base load operating space. FIG. 5 shows that the multi-dimensional representation of the flexible base load map 36 comprises a three-dimensional representation of the operational parameters (e.g., TFire, Mn, and TFuel) and a two-dimensional representation of the power output and efficiency values, which are denoted as Δ Output and Δ Efficiency, respectively. In one embodiment, the three-dimensional representation of the operational parameters TFire, Mn, and TFuel is juxtaposed with the two-dimensional representation of the power output and efficiency values Δ Output and Δ Efficiency. As shown in FIG. 5, the three-dimensional representation of the operational parameters in the flexible base load map 36 comprises a first axis representative of values associated with the firing temperature TFire, a second axis representative of values associated with the position of the inlet guide vanes Mn, and a third axis representative of values associated with the fuel temperature TFuel, whereas the two-dimensional representation of the power output and efficiency values comprises a first axis representative of the power output values, Δ Output, and a second axis representative of the efficiency values, Δ Efficiency.

In the example depicted in FIG. 5, the flexible base load map 36 shows that the firing temperature TFire, the Mach number Mn, and the fuel temperature TFuel are variable in this base load operating space which covers the primary base load operating space 50 and the expanded portion 52. As shown in FIG. 5, the firing temperature TFire can range from 2830 F to 2865 F, while the Mach number Mn ranges from 0.8 to 0.84, and the fuel temperature TFuel can range from 600 F in the region where the primary base load operating space 50 adjoins with the expanded portion 52 containing the secondary base load operating space to 200 F at the region furthest away from the adjoining section.

With this flexible base load map 36 showing an operating space of optimum operating conditions for operating a power plant such as, for example, a combined-cycle power plant, a plant operator can use the operating space as guidance to select specific settings of operational parameters of the power plant during base load at predetermined ambient conditions. To this extent, depending on the desired objectives of how the power plant is to be operated, the plant operator can select values for the firing temperature TFire, the Mach number Mn, and the fuel temperature TFuel that will result in the type power output and efficiency that meets these objectives. For example, if the plant operator desires to operate the power plant to achieve target output and efficiency, the operator could focus on using the operating space in the flexible base load map 36 that is covered by the primary base load operating space 50. To this extent, the operator can use the increased operating space of firing temperature TFire and the Mach number Mn, which extends from 2830 F to 2865 F and from 0.8 to 0.84, respectively, to adjust TFire and Mn values in a manner that achieve a target output and efficiency while satisfying a particular objective or interest. This can include adjusting the target plant load and efficiency to accommodate scenarios where it is desirable to maximize revenue, forecast operational scenarios, manage outages and availability, purchase fuel, and plan for service and maintenance.

In another example of use of the flexible base load map 36 depicted in FIG. 5, the plant operator can use the expanded portion 52 of the base load operating space that is indicative of the secondary base load operating space to select optimum conditions for the firing temperature TFire, Mach number Mn and the fuel temperature TFuel, in those instances where it is desired to run at a higher output, but at sub-optimal efficiency. For example, a plant operator could choose to operate the power plant at a firing temperature TFire of 2865 F, a Mach number Mn of 0.84, and a fuel temperature TFuel of 200 F. In this scenario, as noted in FIG. 5, the output of the power plant would have increased such that there is a 4.3% increase in capacity in comparison to the point depicted in the figure with the star that operates at a firing temperature TFire of 2830 F and a Mach number Mn of 0.8. However, this increased output would come at a decrease in efficiency of the power plant. Such operating scenarios where operating at an increased output, but at a sub-optimal efficiency, may be desirable in certain instances. These instances could arise in circumstances that can include, but are not limited to, maximizing revenue, forecasting operational scenarios, managing outages and availability, purchasing fuel, and planning for service and maintenance. For example, in one embodiment, the operator can adjust the firing temperature TFire, the Mach number Mn, and the fuel temperature TFuel values in the secondary base load space in a manner where output and efficiency are not the primary objectives. In one embodiment, the plant operator can adjust the firing temperature TFire, the Mach number Mn, and the fuel temperature TFuel values in the secondary base load space of the flexible base load map 36 to maximize operational revenue in a spot market by selling power that allows for the highest possible capacity payments. In some instances, this can be of interest to power plant operators even despite the effect that there will be sub-optimal efficiency.

Figure 6:
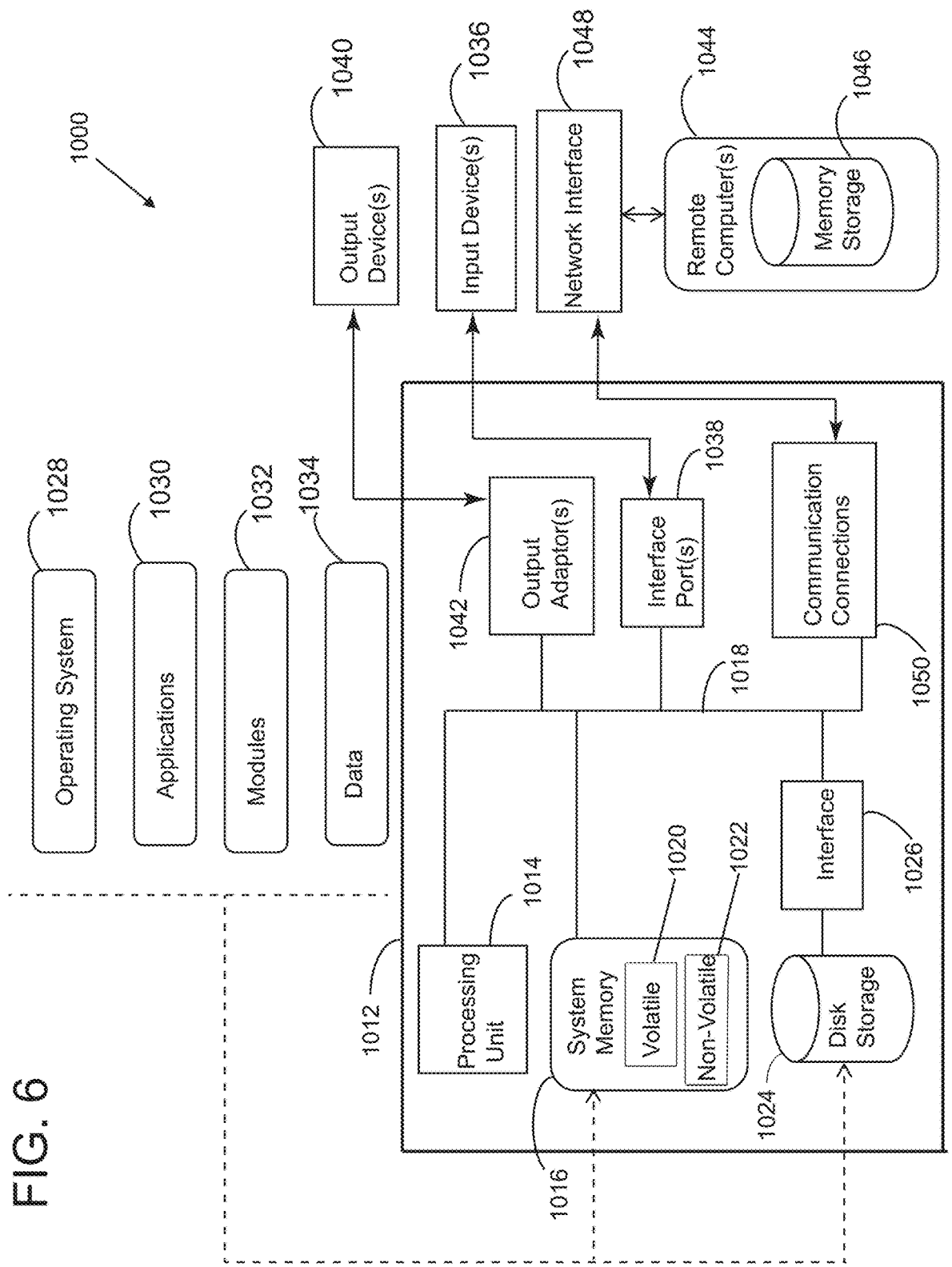
FIG. 6 is an example computing environment in which the various embodiments may be implemented.
Figure 7:
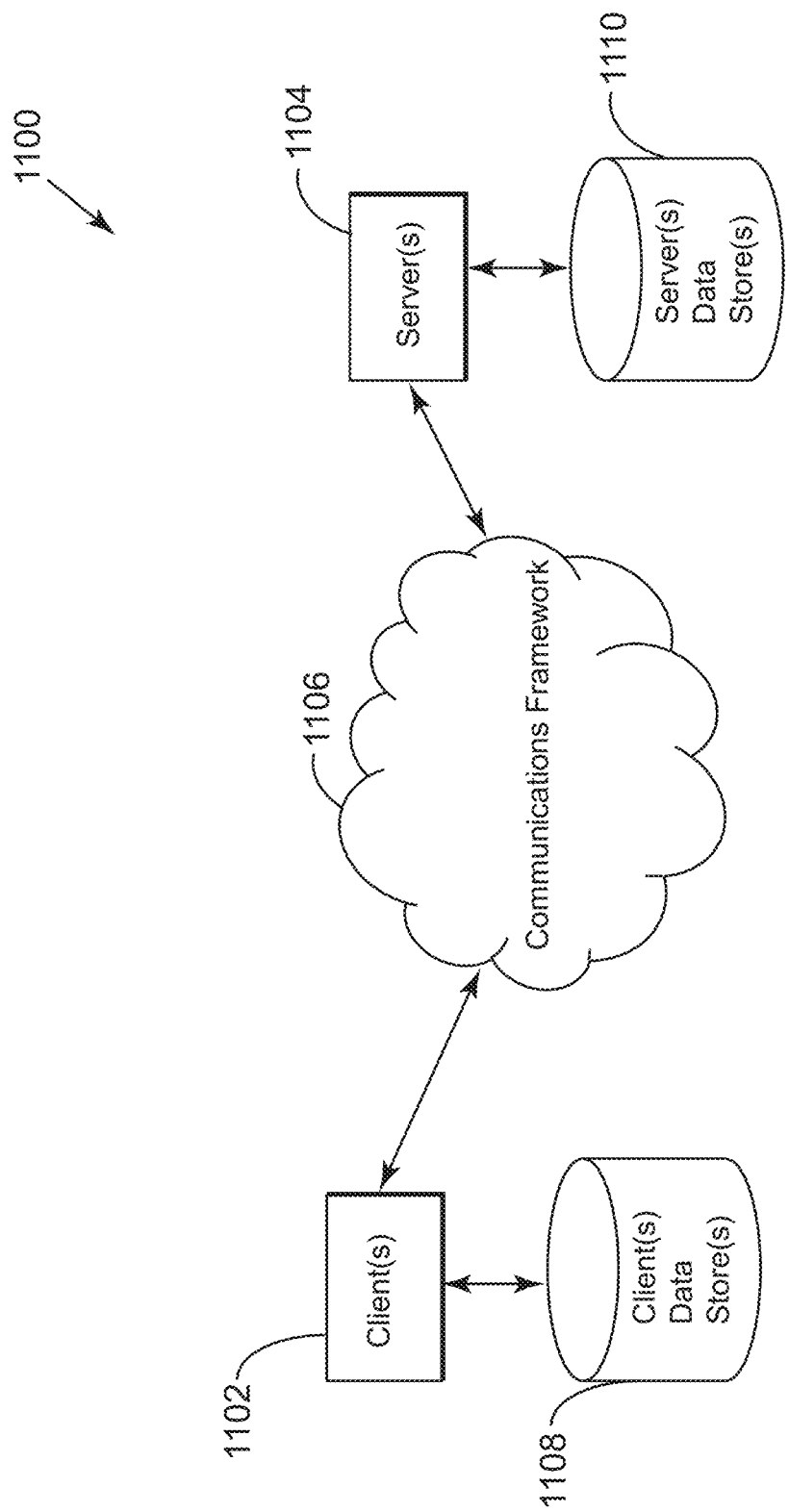
FIG. 7 is an example networking environment in which the various embodiments may be implemented.

In order to provide a context for the various aspects of the disclosed subject matter, FIGS. 6 and 7 as well as the following discussion are intended to provide a brief, general description of a suitable environment in which the various aspects of the disclosed subject matter may be implemented.

With reference to FIG. 6, an example environment 1000 for implementing various aspects of the aforementioned subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 6 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 6 describes software that acts as an intermediary between users and the basic computer resources described in suitable operating environment 1000. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 7 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A method for generating guidance for operating a power plant having at least one gas turbine to meet base load power demands, comprising: obtaining, by a system comprising at least one processor, a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine; correlating, by the system, the plurality of base load data for the operational parameters to power output and efficiency values that are attained by the power plant while operating at each of the plurality of base load settings at the predetermined ambient conditions during base load; determining, by the system, a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency; expanding, by the system, the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating, by the system, a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, offering an operator of the power plant with flexibility in controlling the power plant during base load.

The method of the preceding clause, wherein the generating of the representation of the flexible base load map comprises generating, by the system, a visual representation of the aggregation of the primary base load operating space and the expanded portion of the base load operating space.

The method of any of the preceding clauses, wherein the visual representation comprises a multi-dimensional representation of the flexible base load map.

The method of any of the preceding clauses, wherein the multi-dimensional representation of the flexible base load map differentiates the primary base load operating space from the expanded portion of the base load operating space.

The method of any of the preceding clauses, wherein the multi-dimensional representation of the flexible base load map comprises a three-dimensional representation of the operational parameters and a two-dimensional representation of the power output and efficiency values, wherein the three-dimensional representation of the operational parameters is juxtaposed with the two-dimensional representation of the power output and efficiency values.

The method of any of the preceding clauses, wherein the three-dimensional representation of the operational parameters comprises a first axis representative of values associated with the firing temperature, a second axis representative of values associated with the position of the inlet guide vanes, and a third axis representative of values associated with the fuel temperature, and the two-dimensional representation of the power output and efficiency values comprises a first axis representative of the power output values and a second axis representative of the efficiency values.

The method of any of the preceding clauses, wherein the obtaining of the plurality of base load data related to the operational parameters comprises obtaining, by the system, a plurality of operating data of the plant over an operating range associated with each segment of the primary base load operating space and the expanded portion of the base load operating space, and a plurality of ambient temperature data.

The method of any of the preceding clauses, wherein the power plant comprises a combined-cycle power plant.

A system, comprising: a memory that stores executable components; at least one processor, operatively coupled to the memory, that executes the executable components, the executable components comprising: a flexible base load map generation component for generating a flexible base load map for operating a power plant having at least one gas turbine to meet base load power demands, the flexible base load map generation component configured to perform the method comprising: obtaining, by the processor, a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine; correlating, by the processor, the plurality of base load data for the operational parameters to power output and efficiency values that are attained by the power plant while operating at each of the plurality of base load settings at the predetermined ambient conditions during base load; determining, by the processor, a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency; expanding, by the processor, the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating, by the processor, a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, offering an operator of the power plant with flexibility in controlling the power plant during base load.

The system of the preceding clause, wherein the generating of the representation of the flexible base load map comprises generating, by the processor, a visual representation of the aggregation of the primary base load operating space and the expanded portion of the base load operating space.

The system of any of the preceding clauses, wherein the visual representation comprises a multi-dimensional representation of the flexible base load map.

The system of any of the preceding clauses, wherein the multi-dimensional representation of the flexible base load map differentiates the primary base load operating space from the expanded portion of the base load operating space.

The system of any of the preceding clauses, wherein the multi-dimensional representation of the flexible base load map comprises a three-dimensional representation of the operational parameters and a two-dimensional representation of the power output and efficiency values, wherein the three-dimensional representation of the operational parameters is juxtaposed with the two-dimensional representation of the power output and efficiency values.

The system of any of the preceding clauses, wherein the three-dimensional representation of the operational parameters comprises a first axis representative of values associated with the firing temperature, a second axis representative of values associated with the position of the inlet guide vanes, and a third axis representative of values associated with the fuel temperature, and the two-dimensional representation of the power output and efficiency values comprises a first axis representative of the power output values and a second axis representative of the efficiency values.

The system of any of the preceding clauses, wherein the power plant comprises a combined-cycle power plant.

A non-transitory computer-readable medium having stored thereon executable instructions that, in response to execution, cause a system comprising at least one processor to perform operations directed to generating a flexible base load map for operating a power plant having at least one gas turbine to meet base load power demands, the operations comprising: obtaining a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine; correlating the plurality of base load data for the operational parameters to power output and efficiency values that are attained by the power plant while operating at each of the plurality of base load settings at the predetermined ambient conditions during base load; determining a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency; expanding the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, offering an operator of the power plant with flexibility in controlling the power plant during base load.

The non-transitory computer-readable medium of the preceding clause, wherein the generating of the representation of the flexible base load map comprises generating a visual representation of the aggregation of the primary base load operating space and the expanded portion of the base load operating space.

The non-transitory computer-readable medium of any of the preceding clauses, wherein the visual representation comprises a multi-dimensional representation of the flexible base load map.

The non-transitory computer-readable medium of any of the preceding clauses, wherein the multi-dimensional representation of the flexible base load map differentiates the primary base load operating space from the expanded portion of the base load operating space.

The non-transitory computer-readable medium of any of the preceding clauses, wherein the multi-dimensional representation of the flexible base load map comprises a three-dimensional representation of the operational parameters and a two-dimensional representation of the power output and efficiency values, wherein the three-dimensional representation of the operational parameters is juxtaposed with the two-dimensional representation of the power output and efficiency values.

What is claimed is:

1. A method for generating guidance for operating a power plant having at least one gas turbine to meet base load power demands, comprising:

operating the power plant at an ambient condition and a base load condition;

obtaining, by a system comprising at least one processor, a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine;

correlating, by the system, the plurality of base load data for the operational parameters to power output and efficiency values that are attained by the power plant while operating at each of the plurality of base load settings at the predetermined ambient conditions during base load;

determining, by the system, a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency;

expanding, by the system, the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space; and generating, by the system, a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, wherein the representation of the flexible base load map embodies guidance on how to optimally operate the power plant, at least by adjusting the firing temperature, a Mach number, and/or the fuel temperature of the power plant based on physical, operational, and/or economic conditions that results in the secondary base load operating space with the higher plant power output and sub-optimal efficiency in relation to the primary base load operating space, offering an operator of the power plant with flexibility in controlling the power plant during base load; and adjusting, by the system, the operation of the power plant as a function of the flexible base load map, wherein the adjusting of the operation of the power plant includes adjusting at least one of the firing temperature, a Mach number, and/or fuel temperature of the at least one gas turbine.

2. The method of claim 1, wherein the generating of the representation of the flexible base load map comprises generating, by the system, a visual representation of the aggregation of the primary base load operating space and the expanded portion of the base load operating space.

3. The method of claim 2, wherein the visual representation comprises a multi-dimensional representation of the flexible base load map.

4. The method of claim 3, wherein the multi-dimensional representation of the flexible base load map differentiates the primary base load operating space from the expanded portion of the base load operating space.

5. The method of claim 3, wherein the multi-dimensional representation of the flexible base load map comprises a three-dimensional representation of the operational parameters and a two-dimensional representation of the power output and efficiency values, wherein the three-dimensional representation of the operational parameters is juxtaposed with the two-dimensional representation of the power output and efficiency values.

6. The method of claim 5, wherein the three-dimensional representation of the operational parameters comprises a first axis representative of values associated with the firing temperature, a second axis representative of values associated with the position of the inlet guide vanes, and a third axis representative of values associated with the fuel temperature, and the two-dimensional representation of the power output and efficiency values comprises a first axis representative of the power output values and a second axis representative of the efficiency values.

7. The method of claim 1, wherein the obtaining of the plurality of base load data related to the operational parameters comprises obtaining, by the system, a plurality of operating data of the plant over an operating range associated with each segment of the primary base load operating space and the expanded portion of the base load operating space, and a plurality of ambient temperature data.

8. The method of claim 1, wherein the power plant comprises a combined-cycle power plant.

9. A system, comprising:
a power plant having at least one gas turbine operating at an ambient condition and a base load condition;
a power plant controller to control operation of the power plant, the power plant controller including:
a memory that stores executable components;
at least one processor, operatively coupled to the memory, that executes the executable components, the executable components comprising:
a flexible base load map generation component for generating a flexible base load map for operating the power plant having at least one gas turbine to meet base load power demands, the flexible base load map generation component configured to perform a method comprising:
obtaining, by the processor, a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine;
correlating, by the processor, the plurality of base load data for the operational parameters to power output and efficiency values that are attained by the power plant while operating at each of the plurality of base load settings at the predetermined ambient conditions during base load;
determining, by the processor, a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency;
expanding, by the processor, the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space;
generating, by the processor, a representation of a flexible base load map for operating the power plant, wherein the flexible base load map includes an aggregation of the primary base load operating space and the expanded portion of the base load operating space,
wherein the representation of the flexible base load map offers a range of operating values for the operational parameters and corresponding power output and efficiency values that are attained while operating the power plant at the range of operating values, wherein the representation of the flexible base load map embodies guidance on how to optimally operate the power plant, at least by adjusting the firing temperature, a Mach number, and/or the fuel temperature of the power plant based on physical, operational, and/or economic conditions that results in the secondary base load operating space with the higher plant power output and sub-optimal efficiency in relation to the primary base load operating space, offering an operator of the power plant with flexibility in controlling the power plant during base load; and wherein the power plant controller is configured to adjust the operation of the power plant as a function of the flexible base load map, wherein the adjusting of the operation of the power plant includes adjusting at least one of the firing temperature, a Mach number, and/or fuel temperature of the at least one gas turbine.

10. The system of claim 9, wherein the generating of the representation of the flexible base load map comprises generating, by the processor, a visual representation of the aggregation of the primary base load operating space and the expanded portion of the base load operating space.

11. The system of claim 10, wherein the visual representation comprises a multi-dimensional representation of the flexible base load map.

12. The system of claim 11, wherein the multi-dimensional representation of the flexible base load map differentiates the primary base load operating space from the expanded portion of the base load operating space.

13. The system of claim 11, wherein the multi-dimensional representation of the flexible base load map comprises a three-dimensional representation of the operational parameters and a two-dimensional representation of the power output and efficiency values, wherein the three-dimensional representation of the operational parameters is juxtaposed with the two-dimensional representation of the power output and efficiency values.

14. The system of claim 13, wherein the three-dimensional representation of the operational parameters comprises a first axis representative of values associated with the firing temperature, a second axis representative of values associated with the position of the inlet guide vanes, and a third axis representative of values associated with the fuel temperature, and the two-dimensional representation of the power output and efficiency values comprises a first axis representative of the power output values and a second axis representative of the efficiency values.

15. The system of claim 9, wherein the power plant comprises a combined-cycle power plant.

16. A non-transitory computer-readable medium having stored thereon executable instructions that, in response to execution, cause a power plant controller comprising at least one processor to perform operations directed to controlling operation of a power plant having at least one gas turbine to meet base load power demands, the operations comprising:

operating the power plant at an ambient condition and a base load condition;

obtaining a plurality of base load data related to operational parameters of the power plant during base load at a plurality of base load settings at predetermined ambient conditions, the operational parameters including firing temperature of the gas turbine, a position of inlet guide vanes in the gas turbine, and fuel temperature of the fuel in the gas turbine;

correlating the plurality of base load data for the operational parameters to power output and efficiency values that are attained by the power plant while operating at each of the plurality of base load settings at the predetermined ambient conditions during base load;

determining a primary base load operating space from the correlation of the plurality of base load data for a first set of the operational parameters to the attained power output and efficiency values, wherein the primary the base load operating space provides a representation that associates the power output and efficiency values of the power plant that are attained with the first set of operational parameters while operating at each of the plurality of base load settings at the predetermined ambient conditions during base load, the first set of operational parameters including the firing temperature and the position of the inlet guide vanes, wherein the primary base load operating space is indicative of a primary operating space to attain target plant power output and efficiency;

expanding the primary base load operating space with a portion of the plurality of base load data related to a second set of the operational parameters of the power plant, the second set of the operational parameters including the firing temperature, the position of the inlet guide vanes, and the fuel temperature, wherein the expanded portion of the base load operating space is indicative of a secondary base load operating space that attains higher plant power output and sub-optimal efficiency in relation to the primary base load operating space;

generating a representation of a flexible base load map for operating the power plant, wherein the flexible base load map includes an aggregation of the primary base load operating space and the expanded portion of the base load operating space, wherein the representation of the flexible base load map offers a range of operating values for the operational parameters and corresponding power output and efficiency values that are attained while operating the power plant at the range of operating values, wherein the representation of the flexible base load map embodies guidance on how to optimally operate the power plant, at least by adjusting the firing temperature, a Mach number, and/or the fuel temperature of the power plant based on physical, operational, and/or economic conditions that results in the secondary base load operating space with the higher plant power output and sub-optimal efficiency in relation to the primary base load operating space, offering an operator of the power plant with flexibility in controlling the power plant during base load; and adjusting the operation of the power plant as a function of the flexible base load map, wherein the adjusting of the operation of the power plant includes adjusting at least one of the firing temperature, a Mach number, and/or fuel temperature of the at least one gas turbine.

17. The non-transitory computer-readable medium of claim 16, wherein the generating of the representation of the flexible base load map comprises generating a visual representation of the aggregation of the primary base load operating space and the expanded portion of the base load operating space.

18. The non-transitory computer-readable medium of claim 17, wherein the visual representation comprises a multi-dimensional representation of the flexible base load map.

19. The non-transitory computer-readable medium of claim 18, wherein the multi-dimensional representation of the flexible base load map differentiates the primary base load operating space from the expanded portion of the base load operating space.

20. The non-transitory computer-readable medium of claim 18, wherein the multi-dimensional representation of the flexible base load map comprises a three-dimensional representation of the operational parameters and a two-dimensional representation of the power output and efficiency values, wherein the three-dimensional representation of the operational parameters is juxtaposed with the two-dimensional representation of the power output and efficiency values.

* * * * *